(12) United States Patent
Trim et al.

(10) Patent No.: US 11,630,631 B2
(45) Date of Patent: Apr. 18, 2023

(54) SYSTEMS AND METHODS FOR MANAGING CONTENT ON DUAL SCREEN DISPLAY DEVICES

(71) Applicant: DELL PRODUCTS L.P., Round Rock, TX (US)

(72) Inventors: Damon Trim, Pflugerville, TX (US); John T. Morrison, Round Rock, TX (US); Jace W. Files, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 17/111,593

(22) Filed: Dec. 4, 2020

(65) Prior Publication Data

US 2022/0179610 A1  Jun. 9, 2022

(51) Int. Cl.
| | | |
|---|---|---|
| *G06F 3/14* | (2006.01) | |
| *G06F 3/04883* | (2022.01) | |
| *G06F 3/0482* | (2013.01) | |
| *G06F 3/0486* | (2013.01) | |
| *G06F 1/16* | (2006.01) | |
| *G06F 3/04845* | (2022.01) | |
| *G06F 3/0354* | (2013.01) | |
| *G06F 3/04886* | (2022.01) | |

(52) U.S. Cl.
CPC .......... *G06F 3/1446* (2013.01); *G06F 1/1647* (2013.01); *G06F 1/1681* (2013.01); *G06F 3/0482* (2013.01); *G06F 3/0486* (2013.01); *G06F 3/04845* (2013.01); *G06F 3/04883* (2013.01); *G06F 3/04886* (2013.01); *G06F 3/03545* (2013.01); *G06F 2203/04806* (2013.01); *G06F 2203/04808* (2013.01)

(58) Field of Classification Search
CPC .... G06F 3/1446; G06F 1/1647; G06F 1/1681; G06F 3/0482; G06F 3/04845; G06F 3/0486; G06F 3/04883; G06F 3/03545; G06F 2203/04806; G06F 2203/04808
See application file for complete search history.

(56) References Cited

U.S. PATENT DOCUMENTS

| | | | | |
|---|---|---|---|---|
| 6,545,669 B1 * | 4/2003 | Kinawi | ................ | G06F 3/1438 345/173 |
| 7,565,618 B2 * | 7/2009 | Sheasby | ................ | G06F 3/0486 715/769 |

(Continued)

OTHER PUBLICATIONS

Guerrero et al., "Systems and Methods for Implementing a Dynamic and Contextual on Screen Keyboard", U.S. Appl. No. 16/833,634, filed Mar. 29, 2020, 51 pgs.

(Continued)

*Primary Examiner* — James T Tsai
(74) *Attorney, Agent, or Firm* — Egan, Enders & Huston LLP.

(57) ABSTRACT

Systems and methods are provided that may be implemented to manage display of content on a dual screen information handling system by recognizing dual-screen gestures and/or imparting touch awareness to at least a portion of a non-visual central region existing between the active visual areas of the two display screens of the dual screen system, e.g., between each visual area and a gap area and/or hinge area between the two display screens.

26 Claims, 9 Drawing Sheets

(56) References Cited

U.S. PATENT DOCUMENTS

| | | | | |
|---|---|---|---|---|
| 8,473,870 | B2* | 6/2013 | Hinckley | G06F 3/0483 |
| | | | | 345/173 |
| 9,729,635 | B2* | 8/2017 | Zhou | G06F 3/0488 |
| 10,216,304 | B2 | 2/2019 | Huang | |
| 10,276,081 | B2 | 4/2019 | Ong et al. | |
| 10,423,321 | B2* | 9/2019 | Ligameri | G06F 3/0483 |
| 11,086,582 | B1* | 8/2021 | Lizarazo Patino | G06F 3/0416 |
| 11,226,712 | B2* | 1/2022 | Ichikawa | G09G 5/14 |
| 2007/0186178 | A1* | 8/2007 | Schiller | G06F 3/0486 |
| | | | | 715/838 |
| 2011/0209088 | A1* | 8/2011 | Hinckley | G06F 3/0488 |
| | | | | 715/810 |
| 2011/0209104 | A1* | 8/2011 | Hinckley | G06F 3/04883 |
| | | | | 715/863 |
| 2013/0082958 | A1* | 4/2013 | Reeves | H04W 4/02 |
| | | | | 345/173 |
| 2013/0201113 | A1* | 8/2013 | Hinckley | G06F 15/0291 |
| | | | | 345/173 |
| 2014/0101576 | A1* | 4/2014 | Kwak | G06F 3/0481 |
| | | | | 715/761 |
| 2015/0379964 | A1* | 12/2015 | Lee | H04M 1/72412 |
| | | | | 345/173 |
| 2016/0259544 | A1* | 9/2016 | Polikarpov | G06F 3/0412 |
| 2018/0136822 | A1* | 5/2018 | Seibert | G06F 3/04883 |
| 2018/0335913 | A1* | 11/2018 | Nilo | G06F 3/04817 |
| 2019/0302980 | A1* | 10/2019 | Derks | G06F 3/0486 |
| 2021/0011608 | A1* | 1/2021 | Srinivasan | G06Q 10/10 |
| 2021/0096715 | A1* | 4/2021 | Lee | G06F 1/1618 |
| 2022/0057932 | A1* | 2/2022 | Kim | G06F 3/0483 |

OTHER PUBLICATIONS

Windows.com, "Virtual Desktops in Windows 10/—The Power of Windows . . . Multiplied", Apr. 16, 2015, 6 pgs.

Elgan, Dual-Screen Clamshell Devices Will Kill the Tablet, Computer World, Dec. 23, 2017, 7 pgs.

Piltch, "MSI's Dual Screen Tablet Video Hands-On: Much More Than an eReader", Laptopmag.com, Jan. 9, 2010, 6 pgs.

Microsoft, "Multiple Desktops in Windows 10", Printed from Internet Nov. 14, 2020, 2 pgs.

Brink, "How to Open Task View in Windows 10", Tenforums.com, Printed from Internet Nov. 14, 2020, 3 pgs.

Windowsloop.com, Most Useful Windows 10 Touchscreen Gestures (Must Know), Sep. 18, 2020, 2 pgs.

Microsoft, Use Touch With Windows, Obtained from Internet Nov. 8, 2020, 3 pgs.

Microsoft, "The New Surface Duo", Obtained from Internet Nov. 8, 2020, 11 pgs.

Microsoft, "The New Surface Duo", Obtained from Internet Nov. 8, 2020, 8 pgs.

* cited by examiner

SYSTEMS AND METHODS FOR MANAGING CONTENT ON DUAL SCREEN DISPLAY DEVICES

FIELD

This invention relates generally to information handling systems and, more particularly, to on screen keyboards.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

One type of information handling system is a dual screen device that has a bezel or gap between the two screens.

SUMMARY

Disclosed herein are systems and methods that may be implemented to manage display of content on a dual screen information handling system by recognizing dual-screen gestures and/or imparting touch awareness to at least a portion of a non-visual central region existing between the active visual areas of the two display screens of the dual screen system, e.g., between each visual area and a gap area and/or hinge area between the two display screens.

In one embodiment, touch awareness of the central region between the two display screens may be enabled in one embodiment by extending the active touch-sensing (e.g., capacitance-sensor) area of each display screen inwardly and beyond the outer boundary of its visual display area and at least partially into the non-visual bezel areas of each of the two display screens so as to create a non-visual and combined touch-sensitive center-bezel touch zone that is positioned at least partially within a non-visual central region located between the two display screens. In one embodiment, logic may be executed on the dual-screen information handling system to accept and respond to user input made to the combined center-bezel touch zone between the two display screens of the system and, in a further exemplary embodiment, to respond to user touches and gestures by managing content on both of the dual screens simultaneously. Using the disclosed systems and methods, user gesture recognition, content management and navigation may be enabled to work at the single screen level as well as in a manner that spans the two screens of the system in order to enable new behaviors.

In one embodiment, logic (e.g., operating system and/or user application/s) executing on the dual-screen information handling system may be executed to recognize one or more predefined dual-screen user gesture/s that are input (e.g., by user finger touch and/or by stylus or pen touch) on or across touch-sensing areas of both display screens of a dual screen information handling system. Examples of such dual-screen user gestures include, but are not limited to, a single user finger or stylus sweep made across the combined center-bezel touch zone and between touch-sensing areas of the two display screens, a single "pinch" motion made simultaneously by a user thumb and a user index finger while the user thumb is touching the touch-sensing area of a first display screen and while the user index finger is touching the touch-sensing area of the second display screen (or vice-versa), etc. Logic executing on the information handling system may further execute to respond to the recognition of a predefined dual-screen gesture by taking one or more corresponding predefined actions that are assigned to the recognized dual-screen gesture.

In one exemplary embodiment, logic executing on the dual-screen information handling system may recognize a dual-screen finger or stylus gesture extending across the combined center-bezel touch zone from one display screen to the other display screen as a dual-screen gesture that drags selected content from one display screen to the other display screen, and then respond to the recognized dual-screen content-dragging gesture by taking one or more predefined actions corresponding to this recognized gesture. Examples of such predefined actions corresponding to a dual-screen content-dragging gesture include, but are not limited to, moving the selected content from one screen to the other screen while at the same time automatically displaying a graphical user interface (GUI) that provides the user with information (e.g., hints) that lists options for how the selected content may be moved and/or dragged from the one display screen to the other display screen.

In another embodiment, logic executing on the dual-screen information handling system may be executed to recognize a user input event (e.g., user finger touch and/or stylus touch) made at least partially to the expanded combined center-bezel touch zone, and to respond to the recognition of the user input event to the combined center-bezel touch zone event by displaying a graphical user interface (GUI) of a visual aggregator utility on at least one of the dual display screens in a portion of the active visual area that is located adjacent to at least one side of the non-visual central region that lies between the active visual areas of the two display screens. In a further embodiment, logic executing on the dual-screen information handling system may execute to recognize predefined user gestures that are made to drag user-selected content from either or both display screens into the touch-sensing area of the combined center-bezel touch zone, and to respond to such a predefined gesture by aggregating and anchoring this user-selected content to the centralized location of the visual aggregator GUI.

In one exemplary embodiment, user-selected content items may be aggregated and anchored as curated content items to a visual clipboard that is displayed in active visual areas adjacent to and either side of the non-visual central region existing between the active visual areas of the two display screens, e.g., where it is available for later selection and movement by the user for use by one or more application/s (or other executing program) that are currently in-focus on either display screen. In this regard, logic executing on the information handling system may recognize and respond to predefined user gesture/s made by moving previously-aggregated content items from the centralized location of the visual aggregator GUI to one of the display screens that is indicated by the user for use by the in-focus program executing thereon. In another embodiment, a predefined user gesture for content items aggregation may be made by capturing user touch or stylus gestures performed across the two display screens of the system simultaneously, e.g., such as a "pinch" motion made simultaneously by a user thumb and a user index finger on either sides of the non-visual central region existing between the active visual areas of the two display screens of the dual screen system.

In one respect, disclosed herein is a method including: simultaneously displaying images on visual display areas of separate respective touchscreen display screens of an information handling system, the separate respective touchscreen display screens being coupled together in side-by-side relationship, and each of the visual display areas being surrounded by a non-visual bezel area; sensing for a presence and location of one or more finger or stylus touch points applied by a user to a portion of a touch-sensing area that extends into the non-visual bezel area of each of the separate respective touchscreen display screens in a position between the visual display areas of the separate respective touchscreen display screens; and logically coupling the touch-sensing area portions that extend into the non-visual bezel area of each of the separate respective touchscreen display screens to form a single combined center-bezel touch zone.

In another respect, disclosed herein is a method including: simultaneously displaying images on visual display areas of separate respective touchscreen display screens of an information handling system, the separate respective touchscreen display screens being coupled together in side-by-side relationship, and each of the visual display areas being surrounded by a non-visual bezel area; sensing for a presence and location of one or more finger or stylus touch points applied on or across each of the separate respective touchscreen display screens; analyzing the sensed finger or stylus touch points to recognize at least one predefined dual-screen gesture; and then responding to the recognition of the predefined dual-screen gesture by taking one or more corresponding predefined actions that are assigned to the recognized dual-screen gesture.

In another respect, disclosed herein is an information handling system, including at least two touchscreen display screens coupled together in side-by-side relationship, with each of the respective touchscreen display screens including: a separate visual display area that is surrounded by a non-visual bezel area, and a touch-sensing area that extends into the non-visual bezel area of the respective touchscreen display screen in a position between the separate visual display areas of the at least two touchscreen display screens. The information handling system may also include at least one programmable integrated circuit coupled to each of the at least two touchscreen display screens, the at least one programmable integrated circuit being programmed to: simultaneously display images on the separate visual display areas of the at least two touchscreen display screen, sense for a presence and location of one or more finger or stylus touch points applied by a user to a portion of the touch-sensing area that extends into the non-visual bezel area of each of the separate respective touchscreen display screens in a position between the visual display areas of the separate respective touchscreen display screens, and logically couple the touch-sensing area portions that extend into the non-visual bezel area of each of the separate respective touchscreen display screens to form a single combined center-bezel touch zone.

DESCRIPTION OF ILLUSTRATIVE EMBODIMENTS

Figure 1:
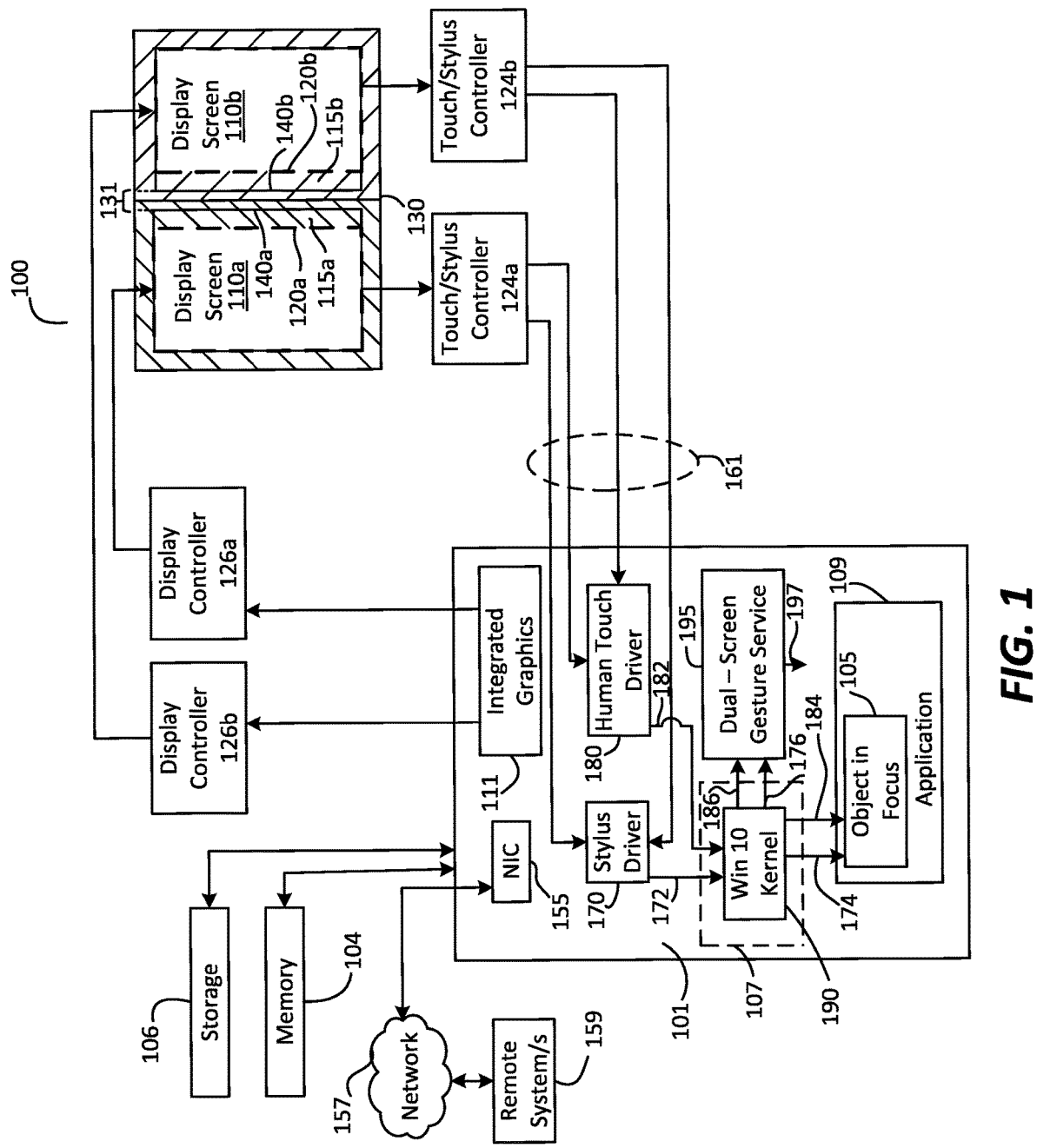
FIG. 1 illustrates a block diagram of dual screen information handling system according to one exemplary embodiment of the disclosed systems and methods.

FIG. 1 illustrates a block diagram of a dual screen information handling system 100 as it may be configured according to one exemplary embodiment of the disclosed systems and methods. Information handling system 100 may be, for example, a portable computer device (e.g., battery-powered laptop or tablet device) having dual touchscreen display screens 110a and 110b that are hingeably coupled together as shown along a hinge line 130 as shown. In FIG. 1, touchscreen display screens 110a and 110b are integrated with other system components of FIG. 1 within the same hinged chassis. These other components include at least one host programmable integrated circuit configured in this embodiment as a central processing unit (CPU) 101 that executes an operating system (OS) 107 with corresponding OS kernel 190 (e.g., Microsoft Windows 10 OS with Win 10 kernel) and applications for system 100. Host programmable integrated circuit 101 may be, for example, an Intel Xeon series processor, an Advanced Micro Devices (AMD) processor or another type of processing device. Further information on touchscreen display technology may be found, for example, in U.S. Pat. Nos. 10,216,304; 10,276,081; and in U.S. patent application Ser. No. 16/833,634 filed Mar. 29, 2020; each of which the foregoing being incorporated herein by reference in its entirety for all purposes.

In the embodiment of FIG. 1, CPU 101 includes integrated graphics processing circuitry 111 that performs graphics processing tasks to provide output digital video signals (e.g., as frame buffer data) via video data bus or data conductors (e.g., HDMI, DVI, SVGA, VGA, etc.) to display controllers 126a and 126b for rendering visual images for display to a user on respective visual display areas 120a and 120b (e.g., LCD or LED display screen or other suitable display screen type) of touchscreen display screens 110a and 110b. Each of visual display areas 120a and 120b is shown in dashed outline in FIG. 1, and is surrounded by a respective non-visual bezel area 115a or 115b (e.g., opaque border surface) that is shown in cross-hatching in FIG. 1.

In FIG. 1, CPU 101 is also coupled as shown to system volatile memory 104, e.g., via a direct data channel. System memory 104 may be, for example, random access memory (RAM), dynamic RAM (DRAM), synchronous DRAM (SDRAM), and/or other suitable volatile storage mediums. Local system storage 106 (e.g., one or more media drives, such as hard disk drives, optical drives, solid state drives (SSDs), other type of non-volatile random access memory "NVRAM" or Flash, or any other suitable form of internal storage) is also coupled to CPU 101 to provide permanent or persistent storage for the information handling system 100. Also present is a network interface controller 155 that is coupled by a network 157 (e.g., such as the internet or corporate intranet) to one or more remotely-located system/s 159 (e.g.,. such as network server/s).

Still referring to FIG. 1, each of touchscreen display screens 110a and 110b also includes touch-sensing circuitry (e.g., capacitive layers, resistive layers technology, surface acoustic wave transducers, etc.) that defines a respective touch-sensing area 140a or 140b (shown in solid outline) for a corresponding one of separate touchscreen display screens 110a and 110b. The touch-sensing circuitry dynamically senses in real time the presence and specific location/s (e.g., X, Y coordinate positions, etc.) where a user touches the respective touch-sensing area 140a or 140b of its corresponding display screen 110a or 110b with a finger (as used herein the term "finger" includes a thumb), hand, stylus or pen, etc. Each of touch-sensing areas 140a and 140b is shown in solid outline in FIG. 1 and as shown overlies a corresponding one of visual display areas 120a or 120b.

Figure 8:
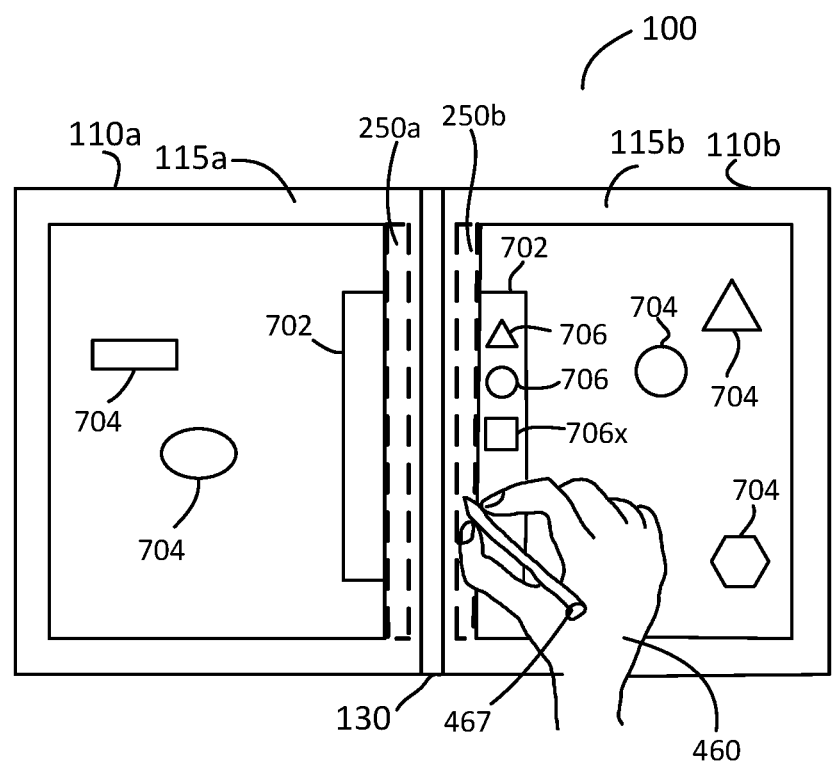
FIG. 8 illustrates a portion of dual touchscreen display screens of FIG. 7 according to one exemplary embodiment of the disclosed systems and methods

In the embodiment of FIG. 1, each of active touch-sensing areas 140a and 140b also extends as shown beyond (and outside) the boundary of its corresponding visual display area 120a or 120b and at least partially into the adjacent portion of the non-visual bezel area 115a or 115b to form a respective extended touch-sensitive bezel zone 250a or 250b that lies between the boundary of the respective visual display area 120a or 120b and the hinge line 130 that couples the two display screens 110a and 110b together as shown in FIG. 8. In one exemplary embodiment, each of active touch-sensing areas 140a and 140b may so extend by 4 millimeters beyond (and outside) the boundary of its corresponding visual display area 120a or 120b to form a respective extended touch-sensitive bezel zone 250a or 250b, although in other embodiments each of active touch-sensing areas 140a and 140b may alternatively extend by distances of greater than or less than 4 millimeters beyond the boundary of its corresponding visual display area 120a or 120b.

When logically coupled together, the extended touch-sensitive bezel zones 250a or 250b of the non-visual bezel areas 115a and 115b create a continuous logically-combined center-bezel touch zone 250 (described and illustrated further herein in relation to FIG. 2 and FIG. 8) that overlaps the non-visual central region existing between the active visual display areas 120a and 120b of the two display screens 110a and 110b of the dual screen system 100. As shown, although a physical gap 131 that includes at least hinge line 130 exists between (and separates) the center outer boundaries of touch-sensing areas 140a and 140b of separate display screens 110a and 110b, this gap 131 is not part of the continuous logical touch-sensing area of logically-coupled and combined center-bezel touch zone 250.

In the embodiment of FIG. 1, information handling system 100 also includes touch/stylus controllers 124a and 124b that are coupled between respective display screens 110a and 110b and corresponding common stylus driver 170 and common human touch driver 180 executing on CPU 101 as shown, i.e., so that each display screen 110a and 110b is provided with its own corresponding touch/stylus controller 124. Each of touch/stylus controllers 124a and 124b receives and processes signals from the touch sensing circuitry of a respective one of display screens 110a or 110b (e.g., signals provided as relative magnitude of generated current, resistance, voltage, etc. that is indicative of the presence and sensed specific location/s where a user's finger, hand or user's stylus (or pen) currently touches the touch-sensing area 140a or 140b of its corresponding display screen 110a or 110b). Each of touch/stylus controllers 124a and 124b in turn communicates data signals 161 (e.g., as Microsoft human interface device (HID) events) representative of the sensed current user touch locations and stylus touch location/s to the common stylus driver 170 and the common human touch driver 180 executing on CPU 101, e.g., via a data bus.

Figure 2:
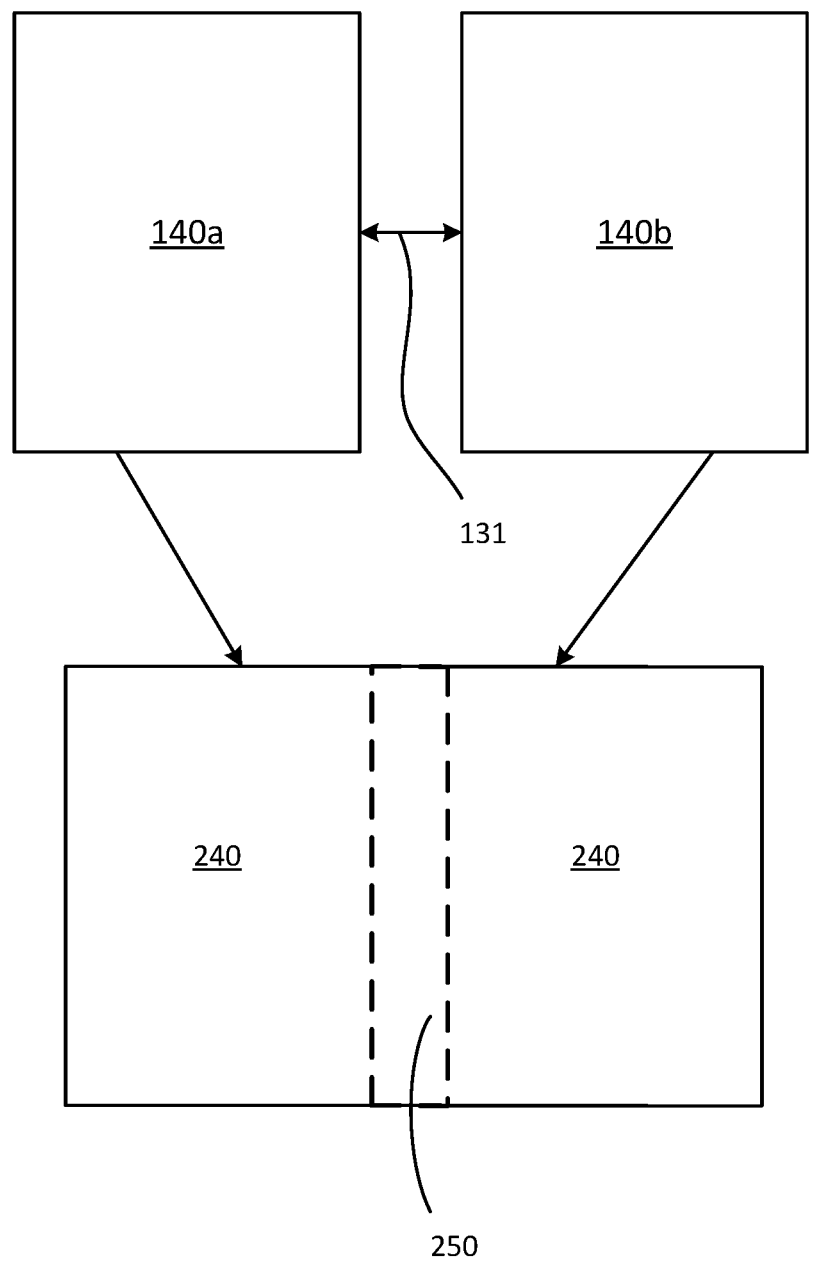
FIG. 2 illustrates combination of separate touch-sensing areas into one larger combined touch-sensing area according to one exemplary embodiment of the disclosed systems and methods.

As shown in FIG. 2, each of common stylus driver 170 and common human touch driver 180 logically stitches together (or combines) separate touch-sensing areas 140a and 140b into one larger combined touch-sensing area 240 that does not include the gap area 131 (including hinge line 130) that exists between the inner boundaries of touch-sensing areas 140a and 140b of separate display screens 110a and 110b. In this manner, dual-screen gestures may be detected and identified by drivers 170 and 180 within the single larger area of combined touch-sensing area 240. Such a dual screen gesture may be a user gesture that occurs on or across both touch-sensing areas 140a and 140b of display screens 110a and 110b, e.g., such as a single user finger or stylus sweep made across center-bezel touch zone 250 and between touch-sensing areas 140a and 140b of display screens 110a and 110b, or a single "pinch" motion made simultaneously by a user thumb 465 and a user index finger 461 while the user thumb 465 is touching the touch-sensing area 140a of display screen 110a and while the user index finger 461 is touching the other touch-sensing area 140b of display screen 110b (or vice-versa), etc.

Referring again to FIG. 1, stylus driver 170 provides stylus event messages 172 (corresponding to a stylus or pen touch) to OS kernel 190 further processing or rerouting, and human touch driver 180 provides human touch event messages 182 (corresponding to a hand or finger touch) to OS kernel 190 for further processing or rerouting according to the type of touch event detected. In this regard, each of stylus driver 170 and human touch driver 180 processes and analyzes the HID events of data signals 161 received from touch/stylus controllers 124a and 124b to determine if any dual-screen gesture events have occurred on touch-sensing areas 140a and 140b (e.g., on or across both display screens 110a and 110b), or if any human touch or stylus events have occurred in the combined center-bezel touch zone 250. Absent any detected dual-screen gesture event or combined center-bezel touch zone event, the analyzed touch events are routed for processing by single screen gesture-interpretation engine logic within OS kernel 190 to detect and/or interpret the meaning of single screen touch gestures (e.g., finger or stylus touch gestures that are confined within the visual display area 120a or 120b of a respective single display screen 110a or 110b). OS kernel 190 then provides this single screen gesture interpretation information as stylus messages 174 and touch messages 184 to an executing application 109 (e.g., internet browser, word processor, spreadsheet application, etc.) as shown and generating a visual object 105 (e.g., task) displayed in focus on one of visual display areas 120a or 120b (e.g., interactive GUI such as web page, spreadsheet or text document, or other visual object generated by the executing application 109).

However, upon detecting occurrence of a dual-screen gesture event or the occurrence of a finger or stylus touch event within the combined center-bezel touch zone 250 or a designated target zone, the detecting driver (i.e., either common stylus driver 170 or common human touch driver 180) addresses the information of the detected event so that it is rerouted through the OS kernel 190 as a stylus message 176 or a touch message 186 to dual-screen gesture service 195 that is executing on CPU 101 as shown. In one embodiment, a dual-screen gesture event is a detected finger or stylus touch event that occurs on or across both of touch-sensing areas 140a and 140b, or within a target zone that is designated according to the mode of the operation. Dual-screen gesture service 195 in turn executes on CPU 101 to interpret the dual-screen gesture event or center-bezel touch zone/target zone touch event information contained in the rerouted information of message 176 or 186. Exemplary embodiments of dual-screen gesture event and center-bezel touch zone/target zone touch event interpretation methodology performed by dual-screen gesture service 195 are illustrated and described further herein in relation to FIGS. 3 to 9.

In the following described embodiments of FIGS. 3 to 9, dual-screen gesture service 195 may be used to recognize and/or interpret dual-screen gesture event or center-bezel touch zone/target zone touch event information when it occurs on one or both of display screens 110a and 110b. Dual-screen gesture service 195 may also communicate and exchange information and commands with other logic components executing on CPU 101 (e.g., such as Win 10 kernel 190), application/s 109, as well as integrated graphics 111 of information handling system 110, to cause display controllers 120a and 120b to display images (e.g., such as application objects 105, content items 704, content aggregator GUI 702, etc.) so as to implement the embodiments of FIGS. 3 to 9 described herein.

Figure 3:
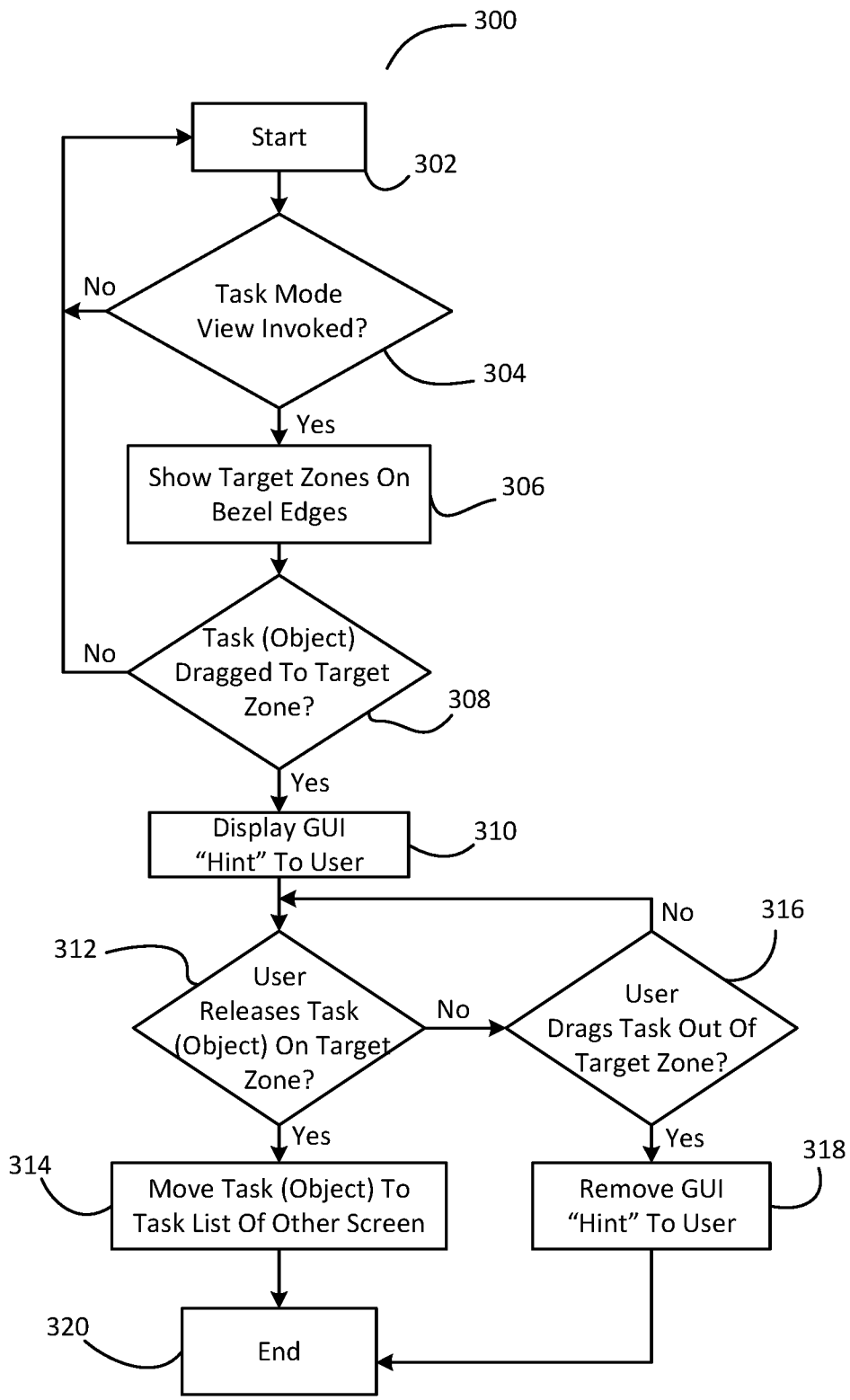
FIG. 3 illustrates methodology according to one exemplary embodiment of the disclosed systems and methods.

FIG. 3 illustrates a methodology 300 that may be employed in one embodiment to selectively move content (e.g., applications) from one display screen 110b to the other opposite display screen 110a, or vice-versa. Methodology 300 begins in step 302 with information handling system 100 powered on, and with CPU 101 executing booted OS 107 (e.g., Microsoft Windows 10) and at least one application 109. In step 304, CPU 101 executes to determine whether or not the Task View mode is invoked or enabled by the system user (e.g., by the user touching a displayed Task View button on the taskbar or by user swiping a finger from the left side of the display screen on a given one of display screens 110a or 110b) to cause each display screen display screen 110a and 110b to show a collage of all open applications (e.g., one or more in focus application object/s 105) that is specific to that display screen. If the Task View mode is not enabled, then methodology 300 returns from step 304 to 302.

Figure 4A:
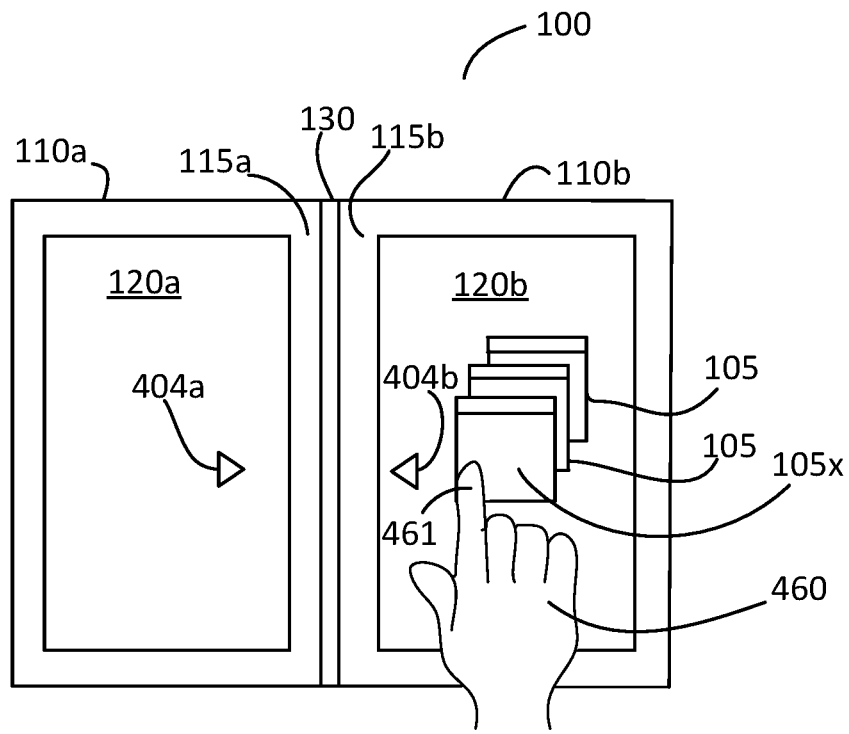
FIG. 4A illustrates a user hand and dual touchscreen display screens of an information handling system according to one exemplary embodiment of the disclosed systems and methods.
Figure 4B:
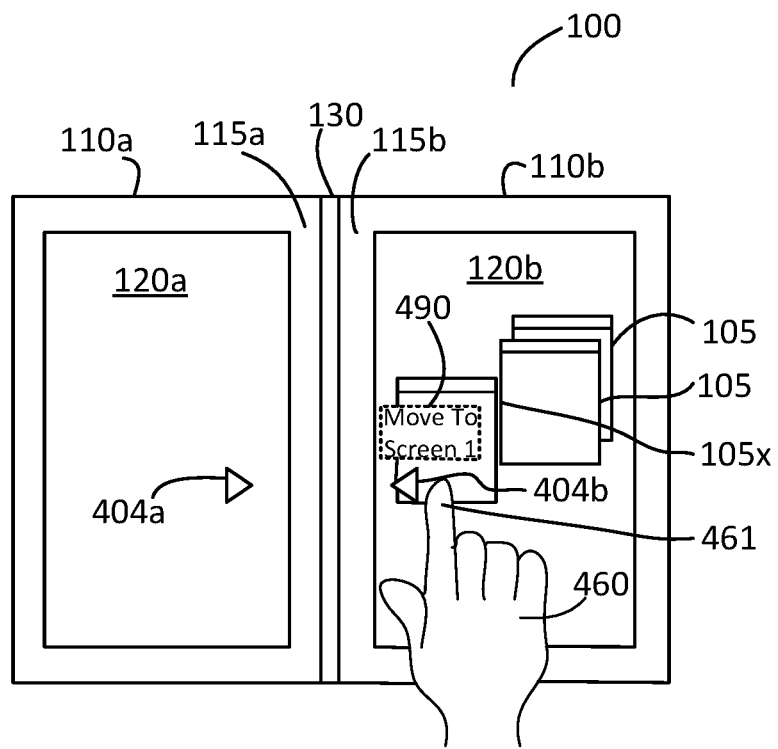
FIG. 4B illustrates a portion of dual touchscreen display screens of FIG. 4A according to one exemplary embodiment of the disclosed systems and methods
Figure 4C:
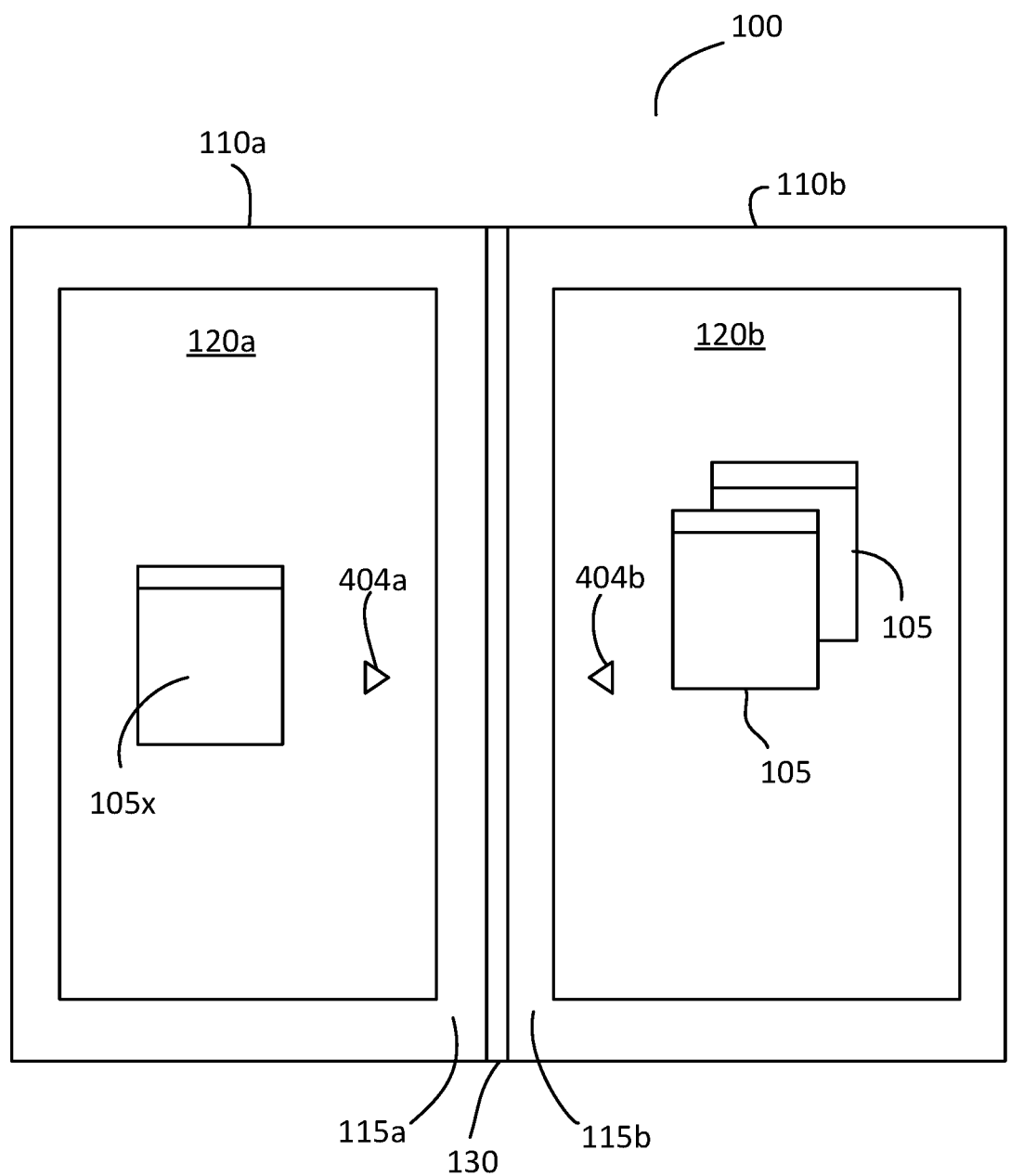
FIG. 4C illustrates a user hand and dual touchscreen display screens of FIG. 4A according to one exemplary embodiment of the disclosed systems and methods.

However, if the Task View mode is found enabled in step 304, then methodology 300 proceeds to step 306 where target zone indicators 404a and 404b (e.g., inward-pointing arrows) are displayed in positions adjacent and in close proximity to the center outer boundary of the respective visual display areas 120a and 120b (i.e., display area boundary that is located adjacent the respective opaque non-visual bezel areas 115a or 115b next to the hinge line 130 or center seam as shown in FIG. 4A). Each of the target zone indicators 404a and 404b designate a respective target zone of its respective display screen 110a or 110b. It will be understood that the position, size and shape of the designated target zones and target zone indicators 404 of FIGS. 4A-4C is exemplary only, and that target zone indicators may have other shapes and sizes, and may designate other sizes and/or shapes of target zones in other positions on display screens 110a and 110b. Examples of other target zone indicator shapes include, but are not limited to, shapes such as circle, oval, diamond, square, etc.

Next, in step 308, CPU 101 executes to determine if a user has used a finger 461 of their hand 460 or used a stylus 467 to inwardly drag (or move) a selected in-focus application object 105 onto a target zone designated by target zone indicator 404a or 404b. This process is illustrated and described below in relation to FIGS. 4B and 4C for a particular selected in-focus application object 105x that is originally displayed in Task View mode on visual display area 120b of display screen 110b with other in-focus application objects 105, it being understood that a similar methodology may also be employed in reverse for a selected in-focus application object 105 that is originally displayed in Task View mode on visual display area 120a of display screen 110a.

As shown in FIG. 4B, the selected in-focus application object 105x displayed on display screen 110b has been dragged or moved (e.g., by a user's finger 461 or stylus 467) to a position on (e.g., at least partially overlapping) the target zone that is designated by the target zone indicator 404b on visual display area 120b. When CPU 101 executes to determine that the in-focus application object 105x has been dragged or moved to a position at least partially on the designated target zone of display panel 110b, then methodology 300 proceeds to step 310 where dual-screen gesture service 195 causes integrated graphics 111 and display controller 126b to display a graphical user interface (GUI) textual message or "hint" 490 (e.g., "Move to Screen 1" or "Move to the Other Screen") that indicates that the in-focus object 105x will be moved to the other display screen 110a if the user "releases" the in-focus object 105x on the designated target zone. In an alternate embodiment, the GUI with "hint" may be displayed when CPU 101 determines that the in-focus application object 105x has been dragged or moved to a position within a predefined distance from the designated target zone of display panel 110b, and/or or when CPU 101 determines that the in-focus application object 105x is being dynamically dragged or moved along a predefined vector or range of vectors toward the designated target zone of display panel 110b.

Next, the CPU 101 executes to determine in step 312 if the user has "released" the in-focus object 105x on the designated target zone, e.g., by lifting the user's finger 461 or stylus 467 out of contact with the upper surface of display screen 110b. If the user has released the in-focus object 105x, then methodology 300 proceeds to step 314, then dual-screen gesture service 195 causes integrated graphics 111 and display controller 126b to move the position of the in-focus object 105x to the Task View of the other display screen 110a, as shown in FIG. 4C. Methodology 300 then returns as shown to step 302 and repeats as before.

However, if the CPU 101 executes to determine in step 312 that the user has not "released" the in-focus object 105x on the designated target zone, then methodology 300 instead proceeds to step 316 where CPU 101 determines if the user maintains finger 461 or stylus 467 in contact with the upper surface of display screen 110b or drags (or moves) the in-focus application object 105x off of the designated target zone into display screen 110b. If the user maintains the in-focus application object 105x on the designated target zone, then methodology 300 repeats to step 312. However, if CPU 101 determines that the user drags or moves the in-focus application object 105x off the designated target zone and back into the visual display area 120b of touch-screen display screen 110b, methodology 300 proceeds to step 318 where dual-screen gesture service 195 causes integrated graphics 111 and display controller 126b to remove (i.e., stop displaying) the GUI message or "hint" that was initially displayed in step 310, e.g., to a position on display screen 110b such as illustrated in FIG. 4A. Methodology 300 then ends in step 320.

Figure 5:
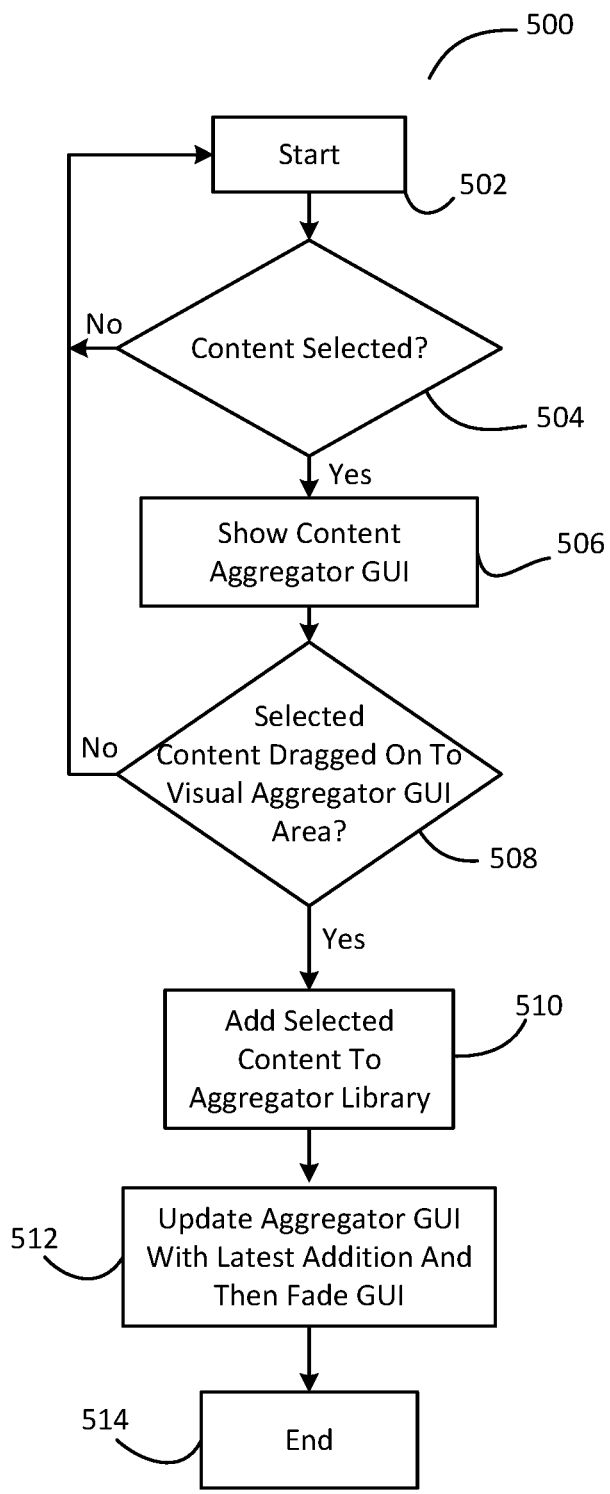
FIG. 5 illustrates methodology according to one exemplary embodiment of the disclosed systems and methods.

FIG. 5 illustrates a methodology 500 that may be employed in one embodiment to aggregate and manage selected content on a dual screen information handling system 100, for example, during normal single desktop view (i.e., non-Task View) mode. Methodology 500 begins in step 502 with information handling system 100 powered on in normal (non-Task View mode), and with CPU 101 executing booted OS 107 (e.g., Microsoft Windows 10) with one or more content items 704 linked to additional content stored on a different and network-connected remote system/s 159 or stored on local storage 106 or local volatile system memory 104 of information handling system 100 (e.g., content items such as reduced-size thumbnail icons linked to stored static photographic images, reduced-size thumbnail icons linked to a stored moving video, reduced-size thumbnail icons linked to other content such as descriptions of items available for purchase or a shopping cart of an online merchant, etc.), and that are displayed on one or both display screens 110a and/or 110b, for example, by an executing application 109 or other firmware or software executing on information handling system 100. In step 504, CPU 101 executes to determine if at least one content item 704 has been selected (e.g., highlighted by long press or using snip tool) by user finger 461 or stylus 467 touch. If not, methodology 500 returns to step 502 and repeats as shown.

Figure 7:
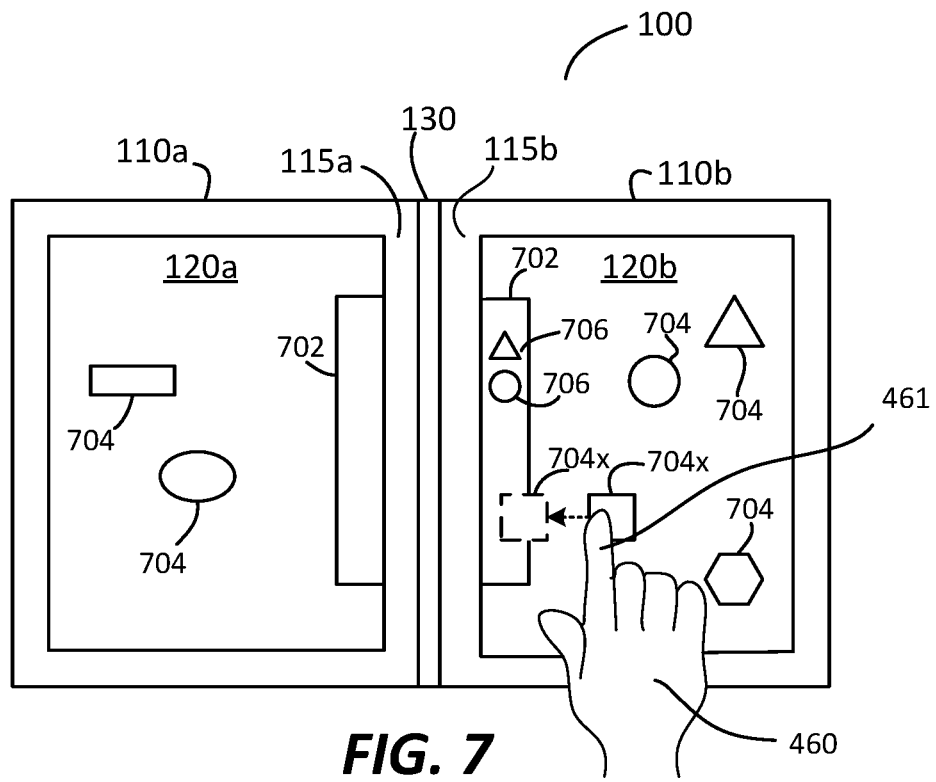
FIG. 7 illustrates a user hand and dual touchscreen display screens of an information handling system according to one exemplary embodiment of the disclosed systems and methods.

However, if it is determined in step 504 that at least one content item 704x has been selected from displayed content item/s 704 on display screen 110a and/or 110b, then methodology 500 proceeds to step 506 where a content aggregator GUI 702 is displayed in a position on both sides of the combined center-bezel touch zone 250 and straddling the respective opaque non-visual bezel areas 115a or 115b next to the hinge line 130 or center seam as shown in FIG. 7. As further described herein, displayed content aggregator GUI 702 provides both a designated target zone into which a selected content item 704x from either display screen 110a or 110b may be placed for aggregation by the user (e.g., as "spine clippings"), and also displays reduced-size thumbnail icons of the aggregated content that has been so placed within the target zone of the content aggregator GUI 702. It will be understood that the position, size and shape of the displayed content aggregator GUI 702 of FIG. 7 is exemplary only, and that a displayed content aggregator GUI may have other sizes and/or shapes in other positions on display screens 110a and 110b.

Next, in step 508, CPU 101 executes to determine if a selected content item 704x has been placed (i.e., dragged or moved) by the user finger 461 or stylus 467 touch into the visual area of the content aggregator GUI 702 as shown by the dashed arrow and dashed content item 704x outline in FIG. 7. If not, methodology 500 returns to step 502 and repeats as shown. However, if CPU 101 executes to determine that selected content item 704x has been dragged or moved into the visual area of the content aggregator GUI 702, then methodology 500 proceeds to step 510 where the identity (e.g., identifier, link, pointer, etc.) of the selected content item 704x placed in the visual area of the content aggregator GUI 702 is added to a content aggregator library that is stored within volatile memory 104 and/or storage 106 of information handling system 100. In step 512, the dual-screen gesture service 195 then updates the displayed visual content aggregator GUI 702 to include at least a partial visual reduced-size thumbnail icon 706x of the newly added selected content item 704x of step 510 (as shown in FIG. 8) and then fades or hides the content aggregator GUI 702, e.g., instantaneously or after a pre-defined display time period such as 3 seconds or other selected greater or lesser time period. Methodology 500 then ends in step 514.

Figure 6:
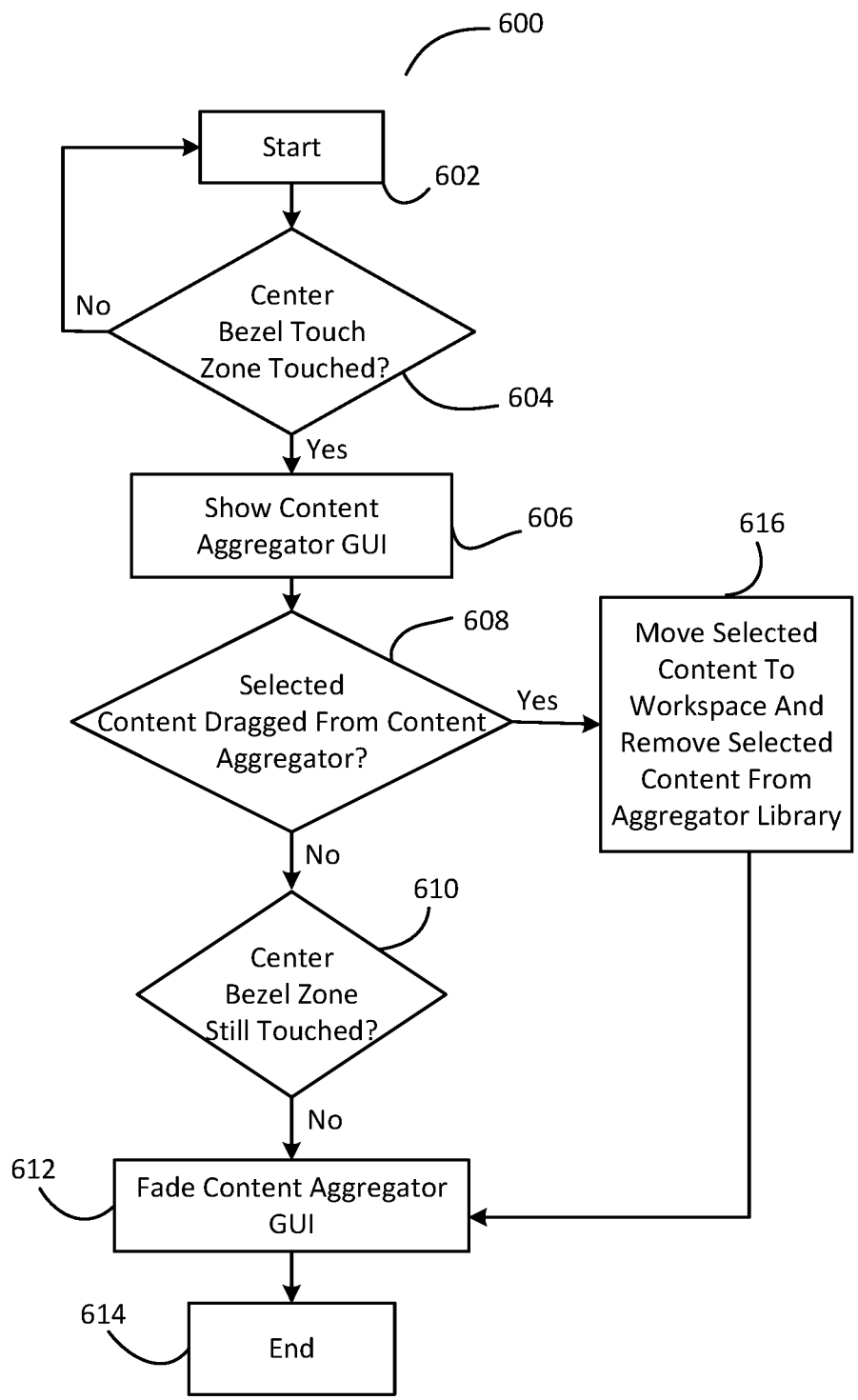
FIG. 6 illustrates methodology according to one exemplary embodiment of the disclosed systems and methods.

FIG. 6 illustrates a methodology 600 that may be employed in one embodiment to allow a user to selectably access and view the visual content aggregator GUI 702, together with its visual reduced-size thumbnail icons 706 of content items 704 that are currently stored in the content aggregator library of previously-described step 510 of FIG. 5. Methodology 600 begins in step 602 with information handling system 100 powered on in normal (non-Task View mode), and with CPU 101 executing booted OS 107 (e.g., Microsoft Windows 10). In step 604, CPU 101 executes to determine whether either one of extended touch-sensitive bezel zones 250a or 250b of combined center-bezel touch zone 250 has been touched by a user's finger 461 or stylus 467, e.g., as illustrated by stylus 463 touch in the embodiment of FIG. 8. If not, then methodology 600 returns to step 602 and repeats.

However, if it is determined in step 604 that at least one of one of extended touch-sensitive bezel zones 250a or 250b is being touched by a user's finger 461, stylus 467=or gesture, then methodology 600 proceeds to step 606 where the content aggregator GUI 702 is displayed in its previously-described position on both sides of the combined center-bezel touch zone 250 and straddling the respective opaque non-visual bezel areas 115a or 115b next to the hinge line 130 or center seam as shown in FIG. 7. When so displayed, content aggregator GUI 702 shows visual reduced-size thumbnail icons 706 of content items 704 that are currently stored in the content aggregator library as illustrated in FIG. 8.

Next, in step 608, CPU 101 executes to determine if content items 704 have been selected (e.g., highlighted by long press or using snip tool) and dragged or moved by user finger 461 or stylus 467 touch from the visual area of the content aggregator GUI 702 and into the main visual working area of display screen 110a or 110b. If not, methodology 600 continues to step 610 where dual-screen gesture service 195 determines if at least one of one of extended touch-sensitive bezel zones 250a or 250b is being touched by the user's finger 461 or stylus 467. If not, then methodology 600 proceeds to step 612 where dual-screen gesture service 195 causes integrated graphics 111 and display controllers 126a and 126b to fade or hide the content aggregator GUI 702, e.g., after a pre-defined display time period such as 3 seconds or other selected greater or lesser time period. Methodology 600 then ends in step 614.

However, if CPU 101 executes to determine that selected content item/s 704 have been dragged or moved by user finger 461 or stylus 467 touch from the visual area of the content aggregator GUI 702 into the main visual working area of display screen 110a or 110b, then methodology 600 proceeds to step 616 where the identity of the selected content items/s 704 dragged from the visual area of the content aggregator GUI 702 is removed from the content aggregator library that is stored within volatile memory 104 and/or storage 106 of information handling system 100, and the displayed visual content aggregator GUI 702 is updated to no longer show the visual reduced-size thumbnail icon 706 of the removed content item/s 704 of step 608. Methodology 600 then proceeds to step 612 which is performed as previously described.

Figure 9:
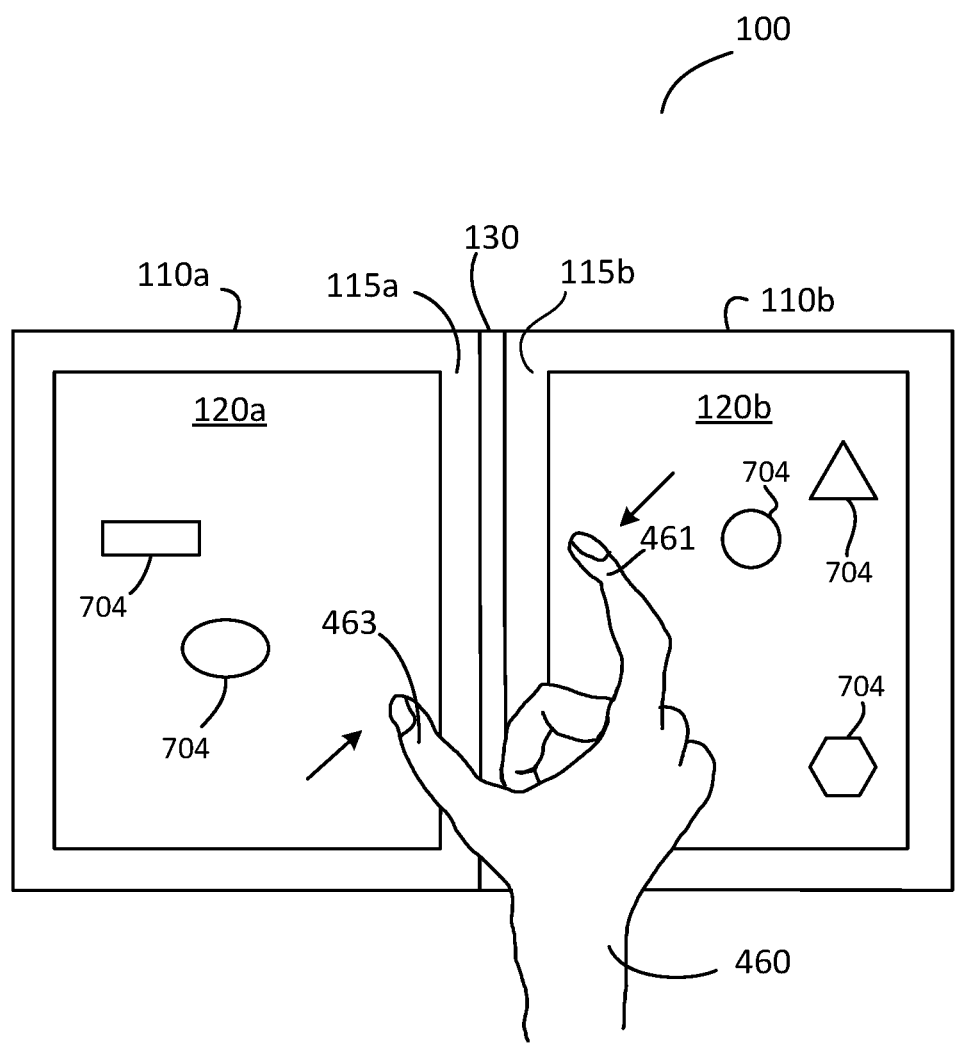
FIG. 9 illustrates a user hand and dual touchscreen display screens of an information handling system according to one exemplary embodiment of the disclosed systems and methods.

FIG. 9 illustrates on exemplary embodiment of an information handling system 100 in which dual-screen gesture service 195 may execute to recognize a dual-screen gesture in the form of a single inward "pinch" motion made simultaneously by a user thumb 465 and a user index finger 465 of a user's hand 460 moving toward each other (as shown by the arrows) while the user thumb 463 is touching the touch-sensing area 140a of the first display screen 110a and while the user index finger 461 is touching the touch-sensing area 140b of the second display screen 110b. It will be understood that an outward "pinch" motion may alternatively be made simultaneously by a user thumb 465 and a user index finger 465 moving apart. In the embodiment of FIG. 9, dual-screen gesture service 195 may further execute to respond to the recognition of such a predefined dual-screen gesture (e.g., stored on storage 106) by taking one or more corresponding predefined actions (e.g., stored on storage 106) that are assigned to the recognized dual-screen gesture, e.g., such as simultaneously zooming displayed content 704 inward (in response to inward pinch motion) or outward (in response to outward pinch motion) on both display screens 110a and 110b. In this regard the displayed content may be zoomed outward (or reduced in size) on both display screens 110a and 110b in the case where the user thumb 463 and a user index finger 461 are brought together toward each other, or may be zoomed inward (or enlarged in size) on both display screens 110a and 110b in the case where the user thumb 463 and the user index finger 461 are moved apart from each other.

It will be understood that the example predefined dual-screen gesture of FIG. 9 input by user thumb 463 and user index finger 461 to dual touchscreen display screens 110a and 110b is exemplary only. In other embodiments, other types of predefined dual-screen gestures (e.g., stored on storage 106) may be recognized that are input to dual touchscreen display screens 110a and 110b by user finger touch and/or by stylus or pen touch on or across touch-sensing areas 120a and 120b of a dual screen information handling system 100. Other types of corresponding response actions (e.g., stored on storage 106) are also possible. Examples of other types of predefined dual-screen user gestures include, but are not limited to, a single user finger or stylus sweep made in contact and across the combined center-bezel touch zone and between touch-sensing areas of the two display screens with a corresponding response action taken to move images or objects between the two display screens that are selected by the user finger or stylus during this sweep of the single user finger or stylus, etc.

It will be understood that the steps of methodologies 300, 500 and 600 are exemplary only, and that any other step order and/or combination of fewer, additional and/or alternative steps may be employed that is suitable for managing display of content 704 on a dual screen information handling system by recognizing dual-screen gestures and/or imparting touch awareness to at least a portion of a non-visual central region existing between the active visual areas of the two display screens of the dual screen system. For example, the methodology of any one of FIG. 3, 5 or 6 may be practiced independently, or the methodology of any one of FIG. 3, 5 or 6 may be practiced in combination with the methodology of any selected other one or more of the of FIG. 3, 5 or 6.

It will also be understood that one or more of the tasks, functions, or methodologies described herein (e.g., including those described herein for components 101, 107, 109, 111, 124a, 124b, 126a, 126b, 170, 180, 190, 195, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more steps of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more steps of the present methodologies may be employed in one or more code segments of the computer program. For example, a code segment executed by the information handling system may include one or more steps of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising:
    simultaneously displaying images on corresponding visual display areas of separate respective touchscreen display screens of an information handling system, the separate respective touchscreen display screens being coupled together in side-by-side relationship, each of the respective touchscreen display screens having a corresponding touch sensing layer area that overlies all of the corresponding visual display area of the respective touchscreen display screen and extends into a corresponding non-visual bezel area of each of the separate respective touchscreen display screens, and each of the visual display areas being surrounded by the corresponding non-visual bezel area with a physical gap existing between and separating the corresponding non-visual bezel areas of the separate respective display screens;
    sensing for a presence and location of one or more finger or stylus touch points applied by a user to a portion of the corresponding touch-sensing layer area that extends into the non-visual bezel area of each of the separate respective touchscreen display screens in a position between the visual display areas of the separate respective touchscreen display screens;
    logically coupling together the corresponding touch-sensing layer area portions that extend into the non-visual bezel area of each of the separate respective touchscreen display screens to form a continuous logically combined center-bezel touch zone that overlaps a non-visual central region existing between the visual display areas of the separate respective touchscreen display screens and that does not include the physical gap existing between and separating the non-visual bezel areas of the separate respective display screens; and
    logically combining the entire touch sensing layer areas of the respective touchscreen display screens together into one larger combined touch-sensing area that includes the entire touch sensing layer areas of the respective touchscreen display screens and the continuous logically combined center-bezel touch zone, and that does not include the physical gap existing between and separating the non-visual bezel areas of the separate respective display screens.

2. The method of claim 1, where the separate respective touchscreen display screens comprise two touchscreen display screens that are hingeably coupled together in side-by-side relationship by a hinge line; and where the corresponding touch-sensing layer area in the non-visual bezel area of each given one of the separate respective touchscreen display screens is disposed between the hinge line and a portion of the outer boundary of the visual display area that is located adjacent the hinge line.

3. The method of claim 1, further comprising:
    aggregating content items selected by one or more finger or stylus touch points of a user into a content aggregator library maintained in volatile and/or non-volatile memory of the information handling system; and
    selectably displaying the aggregated content items of the content aggregator library to a user in a graphical user interface (GUI), the GUI being displayed in the visual display area adjacent the corresponding touch-sensing layer area of the non-visual bezel area of at least one of the touchscreen display screens.

4. The method of claim 3, where each of the content items is linked to additional content stored on a different and network-connected remote system/s or stored on local storage or local volatile system memory of the information handling system.

5. The method of claim 3, further comprising selectably displaying the GUI including the aggregated content items of the content aggregator library to the user in response to a sensed user finger or stylus touch point made to the corresponding touch-sensing layer area of the non-visual bezel area of the at least one touchscreen display screen; and ceasing display of the GUI including the aggregated content items of the content aggregator library to the user in response to an absence of the sensed user finger or stylus touch point made to the corresponding touch-sensing layer area of the non-visual bezel area of the at least one touchscreen display screen.

6. The method of claim 3, further comprising displaying the aggregated content items of the content aggregator library in the GUI in response to sensing a user finger or stylus touch selection of a displayed content item in the visual display area of a given one of the touchscreen display screens; where said aggregating the content items selected by the user into the content aggregator library maintained in volatile and/or non-volatile memory of the information handling system comprises adding a content item selected by the user to the content aggregator library in response to a movement of the selected content item into a displayed area of the GUI on the given one of the separate respective touchscreen display screens by a sensed moving user finger or stylus touch; and where said selectably displaying the aggregated content items of the content aggregator library to a user further comprises displaying the selected content item in the GUI.

7. The method of claim 3, further comprising:
    displaying the aggregated content items of the content aggregator library in the GUI in response to sensing a user finger or stylus touch to the corresponding touch-sensing layer area in the non-visual bezel area of one of the separate respective touchscreen display screens;
    moving a content item selected by the user from the displayed GUI to the visual area of a given one of the touchscreen display screens in response to a movement of the selected content item from the displayed GUI to the given one of the separate respective touchscreen display screens by a sensed moving user finger or stylus touch; and removing from the content aggregator library the selected content item that was moved from the GUI to the given one of the separate respective touchscreen display screens.

8. The method of claim 1, further comprising:

displaying a target zone adjacent the center outer boundary of the visual display area of each of the separate respective touchscreen display screens in a position next to the corresponding touch-sensing layer area that extends into the non-visual bezel area of the separate respective touchscreen display screen; and moving display of an in-focus application object selected by the user from a first one of the touchscreen display screens to a second one of the touchscreen display screens in response to a sensed selection, movement and release of the selected in-focus application object onto the target zone of the first one of the touchscreen display screens by a moving user finger or stylus touch.

9. The method of claim 1, further comprising:

displaying a target zone adjacent the center outer boundary of the visual display area of each of the separate respective touchscreen display screens in a position next to the corresponding touch-sensing layer area that extends into the non-visual bezel area of the separate respective touchscreen display screen;

displaying a textual message on the visual display area of a first one of touchscreen display screens indicating to a user that a selected in-focus application object will be moved from the first one of the touchscreen display screens to a second one of the touchscreen display screens in response to a sensed movement of the selected in-focus application object onto the target zone of the first one of the touchscreen display screens by a moving user finger or stylus touch; and then only one of:

moving display of the in-focus application object selected by the user from the first one of the touchscreen display screens to the second one of the touchscreen display screens in response to release of the selected in-focus application object onto the target zone of the first one of the touchscreen display screens by a user finger or stylus touch and then ceasing display of the textual message on the visual display area of the first touchscreen display screen, or continuing to display of the in-focus application object selected by the user on the first one of the touchscreen display screens in response to movement of the selected in-focus application object away from the target zone of the first one of the touchscreen display screens by a user finger or stylus touch and then ceasing display of the textual message on the visual display area of the first touchscreen display screen.

10. The method of claim 1, where each of the corresponding touch sensing layer areas comprises a capacitive layer or a resistive layer.

11. A method, comprising:

simultaneously displaying images on corresponding visual display areas of separate respective touchscreen display screens of an information handling system, the separate respective touchscreen display screens being coupled together in side-by-side relationship, each of the respective touchscreen display screens having a corresponding touch sensing layer area that overlies all of the corresponding visual display area of the respective touchscreen display screen and extends into a corresponding non-visual bezel area of each of the separate respective touchscreen display screens, and each of the visual display areas being surrounded by the corresponding non-visual bezel area with a physical gap existing between and separating the corresponding non-visual bezel areas of the separate respective display screens;

sensing for a presence and location of one or more finger or stylus touch points applied by a user on or across the corresponding touch-sensing layer area of each of the separate respective touchscreen display screens;

logically coupling together the corresponding touch-sensing layer area portions that extend into the non-visual bezel area of each of the separate respective touchscreen display screens to form a continuous logically combined center-bezel touch zone that overlaps a non-visual central region existing between the visual display areas of the separate respective touchscreen display screens and that does not include the physical gap existing between and separating the non-visual bezel areas of the separate respective display screens;

logically combining the entire touch sensing layer areas of the respective touchscreen display screens together into one larger combined touch-sensing area that includes the entire touch sensing layer areas of the respective touchscreen display screens and the continuous logically combined center-bezel touch zone, and that does not include the physical gap existing between and separating the non-visual bezel areas of the separate respective display screens;

analyzing the sensed finger or stylus touch points to recognize at least one predefined dual-screen gesture; and then responding to the recognition of the predefined dual-screen gesture by taking one or more corresponding predefined actions that are assigned to the recognized dual- screen gesture.

12. The method of claim 11, where the predefined dual-screen gesture comprises at least one of a single finger or stylus sweep made in contact with and across the visual area and the non-visual bezel areas located between the touchscreen display screens, a single pinching motion made simultaneously by a user thumb and a user finger while the user thumb is contacting the corresponding touch-sensing layer area of a first one of the touchscreen display screens at the same time that the user finger is contacting the corresponding touch-sensing layer area of the second touchscreen display screen.

13. The method of claim 11, where the one or more corresponding predefined actions comprise at least one of simultaneously zooming the displayed images inward or outward on both touchscreen display screens.

14. The method of claim 11, where the separate respective touchscreen display screens comprise a first touchscreen display screen coupled in side-by-side relationship with a second touchscreen display screen; where the predefined dual-screen gesture comprises a single user finger or stylus sweep made in contact with and across the visual area and the non-visual bezel areas located between the touchscreen display screens and across the continuous logically-combined center-bezel touch zone from the corresponding touch-sensing layer area of the first touchscreen display screen to the corresponding touch-sensing layer area of the second touchscreen display screen; and where the one or more corresponding predefined actions taken in response to the single user finger or stylus sweep comprise moving displayed content selected by the single user finger or stylus sweep from the visual display area of the first touchscreen display screen to the visual display area of the second touchscreen display screen.

15. The method of claim 11, where each of the corresponding touch sensing layer areas comprises a capacitive layer or a resistive layer.

16. An information handling system, comprising:
at least two touchscreen display screens coupled together in side-by-side relationship, each of the respective touchscreen display screens comprising:
a separate visual display area that is surrounded by a non-visual bezel area with a physical gap existing between and separating the non-visual bezel areas of the separate respective display screens, and
a corresponding touch-sensing layer area that overlies all of the corresponding visual display area of the respective touchscreen display screen and that extends into a corresponding non-visual bezel area of the respective touchscreen display screen in a position between the separate visual display areas of the at least two touchscreen display screens; and
at least one programmable integrated circuit coupled to each of the at least two touchscreen display screens, the at least one programmable integrated circuit being programmed to:
simultaneously display images on the separate visual display areas of the at least two touchscreen display screen,
sense for a presence and location of one or more finger or stylus touch points applied by a user to a portion of the corresponding touch-sensing layer area that extends into the non-visual bezel area of each of the separate respective touchscreen display screens in a position between the visual display areas of the separate respective touchscreen display screens,
logically couple together the corresponding touch-sensing layer area portions that extend into the non-visual bezel area of each of the separate respective touchscreen display screens to form a continuous logically combined center-bezel touch zone that overlaps a non-visual central region existing between the visual display areas of the separate respective touchscreen display screens and that does not include the physical gap existing between and separating the non-visual bezel areas of the separate respective display screens, and
logically combine the entire touch sensing layer areas of the respective touchscreen display screens together into one larger combined touch-sensing area that includes the entire touch sensing layer areas of the respective touchscreen display screens and the continuous logically combined center-bezel touch zone, and that does not include the physical gap existing between and separating the non-visual bezel areas of the separate respective display screens.

17. The information handling system of claim 16, where the separate respective touchscreen display screens comprise two touchscreen display screens that are hingeably coupled together in side-by-side relationship by a hinge line; and where the corresponding touch-sensing layer area in the non-visual bezel area of each given one of the separate respective touchscreen display screens is disposed between the hinge line and a portion of the outer boundary of the visual display area that is located adjacent the hinge line.

18. The information handling system of claim 16, further comprising volatile memory and non-volatile memory coupled to the at least one programmable integrated circuit; and where the at least one programmable integrated circuit is further programmed to:
aggregate content items selected by one or more finger or stylus touch points of a user into a content aggregator library maintained in the volatile and/or the non-volatile memory; and
selectably display the aggregated content items of the content aggregator library to a user in a graphical user interface (GUI), the GUI being displayed in the visual display area adjacent the corresponding touch-sensing layer area of the non-visual bezel area of at least one of the touchscreen display screens.

19. The information handling system of claim 18, where the at least one programmable integrated circuit is further programmed to selectably display the GUI including the aggregated content items of the content aggregator library to the user in response to a sensed user finger or stylus touch point made to the corresponding touch-sensing layer area of the non-visual bezel area of the at least one touchscreen display screen; and ceasing display of the GUI including the aggregated content items of the content aggregator library to the user in response to an absence of the sensed user finger or stylus touch point made to the corresponding touch-sensing layer area of the non-visual bezel area of the at least one touchscreen display screen.

20. The information handling system of claim 18, where the at least one programmable integrated circuit is further programmed to:
display the aggregated content items of the content aggregator library in the GUI in response to sensing a user finger or stylus touch selection of a displayed content item in the visual display area of a given one of the touchscreen display screens;
aggregate the content items selected by the user into the content aggregator library maintained in volatile and/or non-volatile memory of the information handling system by adding a content item selected by the user to the content aggregator library in response to a movement of the selected content item into a displayed area of the GUI on the given one of the separate respective touchscreen display screens by a sensed moving user finger or stylus touch; and
where said selectably display the aggregated content items of the content aggregator library to a user by displaying the selected content item in the GUI.

21. The information handling system of claim 18, where the at least one programmable integrated circuit is further programmed to:
display the aggregated content items of the content aggregator library in the GUI in response to sensing a user finger or stylus touch to the corresponding touch-sensing layer area in the non-visual bezel area of one of the separate respective touchscreen display screens;
move a content item selected by the user from the displayed GUI to the visual area of a given one of the touchscreen display screens in response to a movement of the selected content item from the displayed GUI to the given one of the separate respective touchscreen display screens by a sensed moving user finger or stylus touch; and remove from the content aggregator library the selected content item that was moved from the GUI to the given one of the separate respective touchscreen display screens.

22. The information handling system of claim 16, where the at least one programmable integrated circuit is further programmed to:
  display a target zone adjacent the center outer boundary of the visual display area of each of the separate respective touchscreen display screens in a position next to the corresponding touch-sensing layer area that extends into the non-visual bezel area of the separate respective touchscreen display screen; and
  move display of the in-focus application object selected by the user from a first one of the touchscreen display screens to a second one of the touchscreen display screens in response to a sensed selection, movement and release of the selected in-focus application object onto the target zone of the first one of the touchscreen display screens by a moving user finger or stylus touch.

23. The information handling system of claim 16, where the at least one programmable integrated circuit is further programmed to:
  simultaneously display images on the visual display areas of the separate respective touchscreen display screens;
  sense for a presence and location of one or more finger or stylus touch points applied on or across each of the separate respective touchscreen display screens;
  analyze the sensed finger or stylus touch points to recognize at least one predefined dual-screen gesture; and
  then respond to the recognition of the predefined dual-screen gesture by taking one or more corresponding predefined actions that are assigned to the recognized dual-screen gesture.

24. The information handling system of claim 16, where each of the corresponding touch sensing layer areas comprises a capacitive layer or a resistive layer.

25. A method, comprising:
  simultaneously displaying images on corresponding visual display areas of separate respective touchscreen display screens of an information handling system, the separate respective touchscreen display screens being coupled together in side-by-side relationship, each of the respective touchscreen display screens having a corresponding touch sensing layer area that overlies all of the corresponding visual display area of the respective touchscreen display screen, each of the respective touchscreen display screens having a corresponding touch sensing layer area that overlies all of the corresponding visual display area of the respective touchscreen display screen and extends into a corresponding non-visual bezel area of each of the separate respective touchscreen display screens, and each of the visual display areas being surrounded by the corresponding non-visual bezel area with a physical gap existing between and separating the corresponding non-visual bezel areas of the separate respective display screens;
  sensing for a presence and location of one or more finger or stylus touch points applied on or across each of the separate respective touchscreen display screens;
  logically coupling the corresponding touch-sensing area portions that extend into the non-visual bezel area of each of the separate respective touchscreen display screens to form a combined center-bezel touch zone that does not include the physical gap existing between and separating the non-visual bezel areas of the separate respective display screens;
  logically combining the entire touch sensing layer areas of the respective touchscreen display screens together into one larger combined touch-sensing area that includes the entire touch sensing layer areas of the respective touchscreen display screens and the continuous logically combined center-bezel touch zone, and that does not include the physical gap existing between and separating the non-visual bezel areas of the separate respective display screens;
  analyzing the sensed finger or stylus touch points to recognize at least one predefined dual-screen gesture; and
  then responding to the recognition of the predefined dual-screen gesture by taking one or more corresponding predefined actions that are assigned to the recognized dual-screen gesture;
  where the predefined dual-screen gesture comprises a single finger or stylus sweep made in contact with and across the visual area and the non-visual bezel areas located between the touchscreen display screens.

26. The method of claim 25, where each of the corresponding touch sensing layer areas comprises a capacitive layer or a resistive layer.

* * * * *